United States Patent
Lu et al.

(10) Patent No.: US 11,398,207 B2
(45) Date of Patent: Jul. 26, 2022

(54) MULTI-SCREEN INTERACTIVE NETWORK TEACHING METHOD AND APPARATUS

(71) Applicant: SHENZHEN EAGLESOUL TECHNOLOGY CO., LTD., Shenzhen (CN)

(72) Inventors: Qiwei Lu, Pu'ning (CN); Shanguo Liu, Dalian (CN); Kai Teng, Dalian (CN)

(73) Assignee: SHENZHEN EAGLESOUL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/467,475

(22) PCT Filed: Jun. 26, 2018

(86) PCT No.: PCT/CN2018/092775
§ 371 (c)(1),
(2) Date: Jun. 6, 2019

(87) PCT Pub. No.: WO2019/196204
PCT Pub. Date: Oct. 17, 2019

(65) Prior Publication Data
US 2021/0407462 A1    Dec. 30, 2021

(30) Foreign Application Priority Data
Apr. 9, 2018 (CN) .......................... 201810308947.7

(51) Int. Cl.
*G09G 5/14* (2006.01)
*G06F 3/14* (2006.01)
(Continued)

(52) U.S. Cl.
CPC ............. *G09G 5/14* (2013.01); *G06F 3/1423* (2013.01); *G06V 20/41* (2022.01); *G06V 20/46* (2022.01); *G09B 5/06* (2013.01); *G09G 2340/14* (2013.01)

(58) Field of Classification Search
CPC ................. G09G 5/14; G09G 2340/14; G09G 2320/0613; G09G 2360/16;
(Continued)

(56) References Cited

U.S. PATENT DOCUMENTS 8,435,038 B2 * 5/2013 Wilson ..................... G09B 5/06
434/219
9,448,756 B2  9/2016 Jung et al.
(Continued)

FOREIGN PATENT DOCUMENTS

CN        101021859 A     8/2007
CN    200910136925.8     12/2009
(Continued)

OTHER PUBLICATIONS

Internatinal search report of PCT/CN2018/092775.
Written opinion of PCT/CN2018/092775.

*Primary Examiner* — Xuemei Zheng
(74) *Attorney, Agent, or Firm* — Dragon Sun Law Firm, PC; Jinggao Li, Esq.; Nathaniel Perkins

(57) ABSTRACT

The present disclosure relates to a multi-screen interactive network teaching method and apparatus, an electronic device and a storage medium. The method includes: receiving signals of a plurality of network teaching video sources; analyzing the plurality of network teaching video sources according to a preset analysis algorithm; determining action frequencies of the plurality of network teaching video sources according to analysis results; performing importance level ranking on the network teaching video sources according to the action frequencies of the plurality of
(Continued)

network teaching video sources; acquiring entries of correspondence relationships between preset priorities of a plurality of associated terminal display devices and importance level ranks of the video sources, and according to the entries of correspondence relationships, respectively displaying each of the network teaching video sources via a terminal display device with a priority corresponding to the importance level rank of the network teaching video source.

12 Claims, 7 Drawing Sheets

(51) Int. Cl.
*G09B 5/06* (2006.01)
*G06V 20/40* (2022.01)

(58) Field of Classification Search
CPC .............. G09G 2370/20; G06F 3/1423; G06F 2340/14; G06K 9/00744; G09B 5/065; G09B 5/06; G09B 5/14; G09B 5/10; G09B 5/08; G09B 5/125; G06V 20/41; G06V 20/46

See application file for complete search history.

(56) References Cited

U.S. PATENT DOCUMENTS

| | | | |
|---|---|---|---|
| 9,996,310 B1* | 6/2018 | Bliss | G10L 15/22 |
| 2020/0077138 A1* | 3/2020 | Sawyer | G06F 3/1446 |
| 2020/0090536 A1* | 3/2020 | Xiong | G06N 20/00 |

FOREIGN PATENT DOCUMENTS

| | | |
|---|---|---|
| CN | 103150134 A | 6/2013 |
| CN | 201510027445.3 | 5/2015 |
| CN | 105094737 A | 11/2015 |
| CN | 201510312241.8 | 1/2016 |
| CN | 107371029 A | 11/2017 |

* cited by examiner

Video source 2: Sum value of grayscale comparison values: 1758

Importance level rank: 2

Mass acceleration formula:

$$\ddot{r}_i = \sum_{j \neq i} \frac{\mu_j (r_j - r_i)}{r_{ij}^3} \left\{ 1 - \frac{2(\beta + \gamma)}{c^2} \sum_{l \neq i} \frac{\mu_l}{r_{il}} \right.$$
$$- \frac{2\beta - 1}{c^2} \sum_{k \neq j} \frac{\mu_k}{r_{jk}} + \gamma \left(\frac{\dot{s}_i}{c}\right)^2$$
$$+ (1 + \gamma)\left(\frac{\dot{s}_j}{c}\right)^2 - \frac{2(1+\gamma)}{c^2} \dot{r}_i \cdot \dot{r}_j$$
$$- \frac{3}{2c^2}\left[\frac{(r_i - r_j) \cdot \dot{r}_j}{r_{ij}}\right]^2 + \frac{1}{2c^2}(r_j - r_i)$$
$$\cdot \ddot{r}_j \Bigg\}$$
$$+ \frac{1}{c^2} \sum_{j \neq i} \frac{\mu_j}{r_{ij}^3} \left[(r_i - r_j)\right]$$
$$\cdot \left[(2 + 2\gamma)\dot{r}_i - (1 + 2\gamma)\dot{r}_j\right] (\dot{r}_j - \dot{r}_i)$$
$$+ \frac{3 + 4\gamma}{2c^2} \sum_{j \neq i} \frac{\mu_j \ddot{r}_j}{r_{ij}}$$

*Fig. 2B*

MULTI-SCREEN INTERACTIVE NETWORK TEACHING METHOD AND APPARATUS

CROSS-REFERENCE TO RELATED APPLICATIONS

This application is a national stage application of PCT Application No. PCT/CN2018/092775. This application claims priority from PCT Application No. PCT/CN2018/092775, filed Jun. 26, 2018, and CN Application No. 201810308947.7, filed Apr. 9, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to the technical field of computers, and in particular to a multi-screen interactive network teaching method and apparatus, an electronic device and a computer-readable storage medium.

BACKGROUND ART

In a network teaching scenario, because a user cannot have an immersive learning experience due to only being able to watch a specified video source on one terminal display device, the teaching effect is often affected. With the improvement of people's living standards, a plurality of network teaching video sources are now often displayed on a plurality of terminal display devices of a user, such that teaching scenario mapping of network teaching is expanded.

However, when a user uses a plurality of terminal display devices to watch and learn a plurality of network teaching video sources, it is often impossible to determine the importance levels of the network teaching video sources, leading to there being a need to simultaneously watch the plurality of terminal display devices to be able to gradually determine a network teaching video source with a higher importance level, which process, in turn, reduces the user experience, and brings inconvenience to the user's watching and learning.

In the prior art, with regard to the subject matter concerning the identification and display of importance levels of network teaching video sources, beneficial attempts have been made in some patent applications in the prior art, for example:

the patent application with the application number CN200910136925.8 discloses a video playback device, comprising: video data input means for inputting video data, and level data input/generation means for inputting or generating level data, wherein the levels of scenarios of the video data are ordered according to the importance thereof; playback scenario determination parameter input means for inputting a parameter when determining, according to the importance, a scenario to be played back; playback scenario determination means for determining a playback scenario on the basis of the level data and the playback scenario determination parameter; and display means for displaying the playback scenario. In the disclosure of the application, the importance levels of videos are identified by means of preset importance level data and the division levels of scenarios of video data, which conditionally realizes the identification of the importance levels of video sources, but cannot realize the intelligent identification of the importance level of all the videos.

The patent application with the application number CN201510027445.3 discloses a method for evaluating the importance of a stereoscopic video frame. The method comprises respectively performing cross analysis on error concealment distortion and error diffusion distortion of left and right viewpoint images of a stereoscopic image in an image group, calculating the total distortion of the stereoscopic image, and thus obtaining the importance of the stereoscopic video frame. This application is aimed at analyzing the importance of image frames in the stereoscopic image, but not analyzing the importance of network teaching video sources, namely, network teaching content.

The patent application with the application number CN201510312241.8 discloses an intelligent video analysis system and method, wherein through the intelligent video analysis method and system, only time-dependent monitoring cameras are logically selected, and different levels are assigned to the selected monitoring cameras according to the importance thereof. Hereafter, more video analysis resources are assigned to monitoring cameras with a high importance, so that video analysis can be quickly and effectively performed. It focuses on linking event analysis and importance and allocating more monitoring camera resources according to a determination result, and cannot realize the intelligent identification of the importance level of all videos.

In the prior art, there are also the following problems regarding the identification and display of the importance levels of network teaching video sources:

1. failing to automatically identify the importance levels of video sources by means of the division of importance level identification data;

2. being unable to obtain, by means of the analysis of the importance levels of the network teaching video sources, the importance levels of teaching content corresponding to the network teaching video sources; and 3. failing to automatically identify the importance levels of the video sources by using specific event characteristics or time logic characteristics.

Therefore, there is a need to provide one or more technical solutions that at least can solve the above-mentioned problems.

It should be noted that the information disclosed in the section "Background Art" above is only used to strengthen the understanding of the background of the present disclosure, and thus may include information that does not constitute prior art known to a person skilled in the art.

SUMMARY OF THE INVENTION

The purpose of the present disclosure is to provide a multi-screen interactive network teaching method and apparatus, an electronic device, and a computer readable storage medium, thereby at least overcoming, to a certain extent, one or more problems caused by the limitations and defects of the related art.

According to one aspect of the present disclosure, a multi-screen interactive network teaching method is provided, comprising:

receiving signals of a plurality of network teaching video sources, wherein the plurality of network teaching video sources are associated video sources;

analyzing the plurality of network teaching video sources according to a preset analysis algorithm, and determining action frequencies of the plurality of network teaching video sources according to analysis results;

performing importance level ranking on the network teaching video sources according to the action frequencies of the plurality of network teaching video sources; and acquiring entries of correspondence relationships between preset priorities of a plurality of associated terminal display devices and importance level ranks of the video sources, and according to the entries of correspondence relationships, respectively displaying each of the network teaching video sources via a terminal display device with a priority corresponding to the importance level rank of the network teaching video source.

In one exemplary embodiment of the present disclosure, analyzing the plurality of network teaching video sources according to a preset analysis algorithm, and determining action frequencies of the plurality of network teaching video sources according to analysis results comprises:

periodically extracting a frame image from the signal of each of the network teaching video sources, and calculating an average grayscale value A of the frame image, where: A=(Red+Green+Blue)/3;

acquiring scenario information about the network teaching video source, and presetting a shadow value N according to the scenario information;

obtaining a conversion factor C according to the customized shadow value:

$$C=255/(N-1);$$

calculating a grayscale value G according to the average grayscale value A and the conversion factor C, comprising:

$$G=\text{Math·round}((A/C)+0.5)*C$$

where Math·round is a rounding function; and calculating a sum value of grayscale comparison values H of the network teaching video source according to the grayscale value G:

$$H=\Sigma_1^n\|G_k-\overline{G}\|;$$

where $\overline{G}$ is a mean value of the grayscale values of the signal of the network teaching video source, and the sum value of grayscale comparison values H is used for characterizing the action frequency of the teaching video source.

In one exemplary embodiment of the present disclosure, performing importance level ranking on the network teaching video sources according to the action frequencies of the plurality of network teaching video sources comprises:

ranking average sum values of grayscale comparison values of the network teaching video sources; and determining the importance level of a network teaching video source with the maximum average sum value of grayscale comparison values to be the highest.

In one exemplary embodiment of the present disclosure, the preset analysis algorithm is a customized grayscale shadow comparison method.

In one exemplary embodiment of the present disclosure, the method further comprises:

receiving and saving the preset priorities of the terminal display devices preset by a user; and establishing the entries of correspondence relationships between the preset priorities and the importance level ranks of the video sources.

In one exemplary embodiment of the present disclosure, according to the correspondence entries, respectively displaying each of the network teaching video sources via a terminal display device with a priority corresponding to the importance level ranking of the network teaching video source, comprises:

displaying a video source with the highest importance level via a terminal display device with the highest priority.

In one exemplary embodiment of the present disclosure, the method further comprises:

after detecting a change in the importance levels of the teaching video sources or a change in the priorities of the terminal display devices, updating the entries of correspondence relationships between the preset priorities and the importance level ranks of the video sources;

sending a device switching prompt signal to the terminal display device with the highest priority; and after receiving a response signal, if it is determined to perform playing device switching for the network teaching video sources according to response information carried in the response signal, switching the corresponding terminal display devices for the plurality of network teaching video sources according to the updated entries of correspondence relationships between the preset priorities and the importance level ranks of the video sources.

In one exemplary embodiment of the present disclosure, the method further comprises:

after detecting a terminal display device switching instruction triggered by a user, acquiring information about the correspondence between a teaching video source identifier and a terminal display device to be switched to, which is carried in the terminal display device switching instruction; and according to the information about the correspondence between the teaching video source identifier and the terminal display device to be switched to, displaying the corresponding teaching video source via the terminal display device to be switched to.

In one exemplary embodiment of the present disclosure, the method further comprises:

recording and compiling statistics on the information about the correspondence between the teaching video source identifier and the terminal display device to be switched to, which is carried in the terminal display device switching instruction triggered by the user, so as to obtain a statistical result; and updating the entries of correspondence relationships between the preset priorities and the importance level ranks of the video sources according to the statistical result.

In one exemplary embodiment of the present disclosure, the information about the correspondence between the teaching video source identifier and the terminal display device to be switched to, which is carried in the terminal display device switching instruction, comprises:

if information carried in the terminal display device switching instruction is information about the correspondence between a plurality of teaching video source identifiers and one terminal display device to be switched to, displaying the corresponding plurality of teaching video sources via the one terminal display device to be switched to.

In one exemplary embodiment of the present disclosure, the information about the correspondence between the teaching video source identifier and the terminal display device to be switched to, which is carried in the terminal display device switching instruction, comprises:

if information carried in the terminal display device switching instruction is information about the correspondence between one teaching video source identifier and a plurality of terminal display devices to be switched to, displaying the corresponding one teaching video source respectively on the plurality of terminal display devices to be switched to.

In one exemplary embodiment of the present disclosure, the number of the associated video sources is the same as that of the plurality of associated terminal display devices.

In one aspect of the present disclosure, a multi-screen interactive network teaching apparatus is provided, comprising:

a signal receiving module for receiving signals of a plurality of network teaching video sources, wherein the plurality of network teaching video sources are associated video sources;

a video source analysis module for analyzing the plurality of network teaching video sources according to a preset analysis algorithm, and determining action frequencies of the plurality of network teaching video sources according to analysis results;

a level ranking module for performing importance level ranking on the network teaching video sources according to the action frequencies of the plurality of network teaching video sources; and a multi-screen display module for acquiring entries of correspondence relationships between preset priorities of a plurality of associated terminal display devices and importance level ranks of the video sources, and according to the entries of correspondence relationships, respectively displaying each of the network teaching video sources via a terminal display device with a priority corresponding to the importance level rank of the network teaching video source.

In one aspect of the present disclosure, an electronic device is provided, comprising:

a processor; and a memory having stored thereon computer readable instructions that, when executed by the processor, implement the method as described in any one of the above.

In one aspect of the present disclosure, a computer readable storage medium is provided, having stored thereon a computer program that, when executed by a processor, implements the method as described in any one of the above.

The multi-screen interactive network teaching method in the exemplary embodiments of the present disclosure comprises: receiving signals of a plurality of network teaching video sources, wherein the plurality of network teaching video sources are associated video sources; analyzing the plurality of network teaching video sources according to a preset analysis algorithm, and determining action frequencies of the plurality of network teaching video sources according to analysis results; performing importance level ranking on the network teaching video sources according to the action frequencies of the plurality of network teaching video sources; and acquiring entries of correspondence relationships between preset priorities of a plurality of associated terminal display devices and importance level ranks of the video sources, and according to the entries of correspondence relationships, respectively displaying each of the network teaching video sources via a terminal display device with a priority corresponding to the importance level rank of the network teaching video source. On one hand, by means of the customized grayscale shadow comparison method, action frequencies of various network teaching video sources are quickly analyzed so as to obtain the importance levels of the video sources, and by customizing a shadow value, the identification of the importance levels of video sources in different teaching scenarios is eliminated to some extent, so that this is an efficient and accurate importance level identification algorithm for network teaching video sources. On the other hand, by means of the method involving ranking the priorities of user terminal display devices and making same correspond to the importance levels of network teaching video sources, a user can continuously track important teaching contents, such that the user experience is greatly enhanced.

It should be understood that the above general description and the following detailed description are merely exemplary and illustrative, and should not limit the present disclosure.

BRIEF DESCRIPTION OF THE DRAWINGS

The above-mentioned and other features and advantages of the present disclosure will become more apparent through the description of exemplary embodiments thereof in detail with reference to the accompanying drawings.

FIGS. 2A-2C show schematic diagrams of importance level ranking of network teaching video sources according to an exemplary embodiment of the present disclosure;

DETAILED DESCRIPTION

Figure 1:
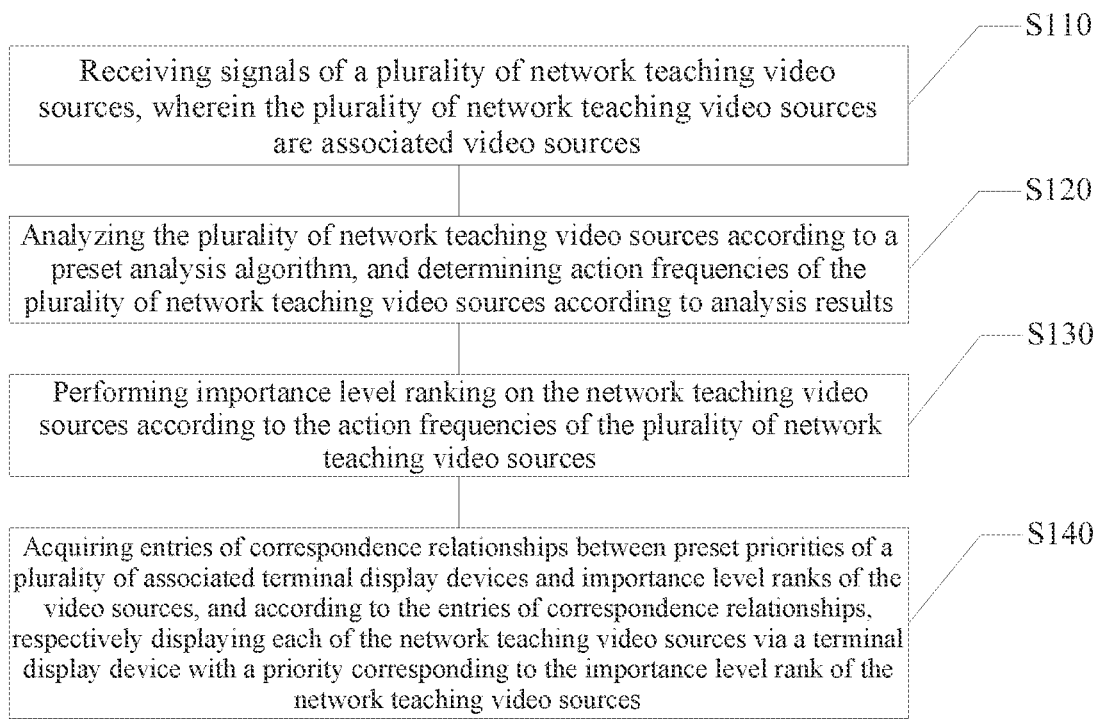
FIG. 1 shows a flowchart of a multi-screen interactive network teaching method according to an exemplary embodiment of the present disclosure.

The exemplary embodiments will now be described more fully with reference to the accompanying drawings. However, the exemplary embodiments can be implemented in various forms and should not be construed as being limited to the embodiments set forth herein; rather, these embodiments are provided so that the present disclosure will be thorough and complete, and the concept of the exemplary embodiments is fully delivered to a person skilled in the art. The same reference numerals in the drawings denote the same or similar components, and thus the repeated description thereof will be omitted.

In addition, the described features, structures, or characteristics may be combined, in any suitable manner, in one or more embodiments. In the following description, numerous specific details are provided to give a thorough understanding of the embodiments of the present disclosure. However, a person skilled in the art will appreciate that the technical solution of the present disclosure may be practiced without one or more of the specific details, or by using other methods, components, materials, apparatuses, steps, etc. In other circumstances, the well-known structures, methods, apparatuses, implementations, materials, or operations are not shown or described in detail to avoid obscuring various aspects of the present disclosure.

The block diagrams shown in the drawing are merely functional entities and do not necessarily have to correspond to physically independent entities. That is, these functional entities may be implemented in the form of software, or these functional entities or some of the functional entities may be implemented in one or more software-hardened modules, or these functional entities may be implemented in different networks and/or processor apparatuses and/or microcontroller apparatuses.

In this exemplary embodiment, a multi-screen interactive network teaching method is first provided, which can be applied to an electronic device, such as a computer. With reference to FIG. 1, the multi-screen interactive network teaching method may comprise the following steps:

S110. receiving signals of a plurality of network teaching video sources, wherein the plurality of network teaching video sources are associated video sources;

S120. analyzing the plurality of network teaching video sources according to a preset analysis algorithm, and determining action frequencies of the plurality of network teaching video sources according to analysis results;

S130. performing importance level ranking on the network teaching video sources according to the action frequencies of the plurality of network teaching video sources; and S140. acquiring entries of correspondence relationships between preset priorities of a plurality of associated terminal display devices and importance level ranks of the video sources, and according to the entries of correspondence relationships, respectively displaying each of the network teaching video sources via a terminal display device with a priority corresponding to the importance level rank of the network teaching video source.

According to the multi-screen interactive network teaching method in this exemplary embodiment, on one hand, by means of the customized grayscale shadow comparison method, action frequencies of various network teaching video sources are quickly analyzed so as to obtain the importance levels of the video sources, and by customizing a shadow value, the identification of the importance levels of video sources in different teaching scenarios is eliminated to some extent, such that this is an efficient and accurate importance level identification algorithm for network teaching video sources. On the other hand, by means of the method involving ranking the priorities of user terminal display devices and making same correspond to the importance levels of network teaching video sources, a user can continuously track important teaching contents, such that the user experience is greatly enhanced.

The multi-screen interactive network teaching method in this exemplary embodiment will be further illustrated below.

In step S110, signals of a plurality of network teaching video sources can be received, wherein the plurality of network teaching video sources are associated video sources.

In this exemplary embodiment, network teaching refers to propagating teaching content via a network, wherein a user is not limited by the place and time, and thus there are a variety of forms of network teaching, and the content displayed to the user is also richer. Therefore, this network teaching content is often transmitted to the user via a plurality of content-associated network teaching video sources for the user to watch and learn.

In step S120, the plurality of network teaching video sources can be analyzed according to a preset analysis algorithm, and action frequencies of the plurality of network teaching video sources can be determined according to analysis results.

In this exemplary embodiment, when the plurality of content-associated network teaching video sources is received, the user may choose to watch one or more video sources, generally preferentially watching network teaching video sources, the importance of the teaching content thereof being higher, in order to improve the learning effect. Without assumptions, often, the higher the action frequency in a network teaching video source, the higher the importance level of the network teaching video source. Therefore, the importance levels of the network teaching video sources can be obtained by analyzing the action frequencies in the network teaching video sources, thereby rapidly ranking the importance levels of the network teaching video sources.

In this exemplary embodiment, analyzing the plurality of network teaching video sources according to a preset analysis algorithm, and determining action frequencies of the plurality of network teaching video sources according to analysis results comprises: periodically extracting a frame image from the signal of each of the network teaching video sources, and calculating an average grayscale value A of the frame image, where: A=(Red+Green+Blue)/3, wherein the average grayscale value of the frame image in the signal of the network teaching video source is calculated to conduct decolorization processing on the frame image so as to obtain a frame image with a luminosity, the specific method comprising: analyzing color values of Red, Green, and Blue of each pixel in the frame image, and finding the sum of same and then calculating an average value, which is the average grayscale value A of the frame image.

While obtaining the average grayscale value of the frame image by means of calculation, it is also necessary to acquire scenario information about the network teaching video sources, and to preset a shadow value N according to the scenario information. Because different teaching scenarios have different background light sources, there may also be errors in the luminosity of the frame image. Therefore, the shadow value N of the scenario information needs to be preset to eliminate the influence of a background light source in a scenario on the luminosity. For example, when the scenario of the network teaching video source is a teaching whiteboard, the shadow value N can be set to 180-240, when the scenario of the network teaching video source is a teaching blackboard, the shadow value N can be set to 10-80, and when the scenario of the network teaching video source is a general teaching scenario such as a classroom, the shadow value N can be set to 100-200.

A conversion factor C is obtained according to the customized shadow value: C=255/(N−1), wherein the conversion factor is used to calculate a grayscale value in combination with the average grayscale value.

A grayscale value G is calculated according to the average grayscale value A and the conversion factor C, comprising: G=Math·round((A/C)+0.5)*C, wherein Math·round is a rounding function, which facilitates the participation of the grayscale value as an integer in subsequent settings or operations, and 0.5 in the equation is a rounding empirical constant for reducing an error influence of the rounding function on the grayscale value as much as possible in the case of a small grayscale value.

A sum value of grayscale comparison values H of the network teaching video source is calculated according to the grayscale value G: $H=\Sigma_1^n \|G_k - \overline{G}\|$; where $\overline{G}$ is a mean value of the grayscale values of the signal of the network teaching video source, and a range of changes in $G_k$ in the equation is from $G_1$ to $G_n$. A change in the content in the frame image of the signal of the network teaching video source will necessarily result in a change in the luminosity of the image, that is, the grayscale value of the image will be changed, and therefore, the degree of change in the content in the frame image of the signal of the network teaching video source can be obtained through statistics by calculating the sum value of grayscale comparison values of the network teaching video source.

The sum value of grayscale comparison values H is used for characterizing the action frequency of the teaching video source, that is, the greater the action frequency of the teaching video source, the higher the degree of change in the content in the frame image of the signal of the network teaching video source, and the greater the sum value of grayscale comparison values H. Therefore, the sum value of grayscale comparison values has a positive correlation with the action frequency of the teaching video source.

In step S130, importance level ranking can be performed on the network teaching video sources according to the action frequencies of the plurality of network teaching video sources.

Figure 2A:
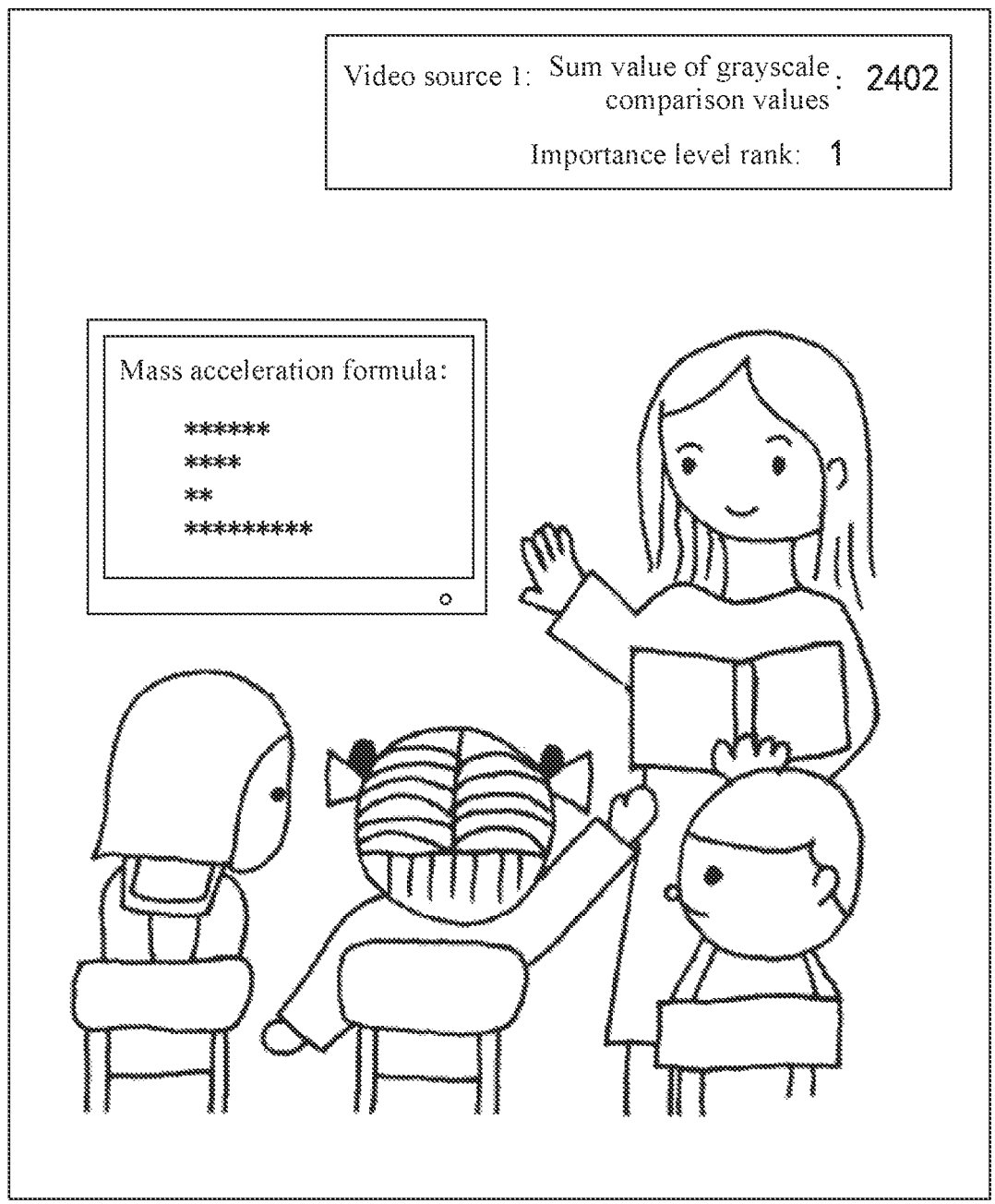
Figure 2C:

In this exemplary embodiment, since the action frequency of and writing on the board by of a teacher, or a variability frequency of courseware in an actual network teaching scenario, etc. directly reflects the importance degree of the current teaching content, the importance levels of the network teaching video sources can be reflected according to the action frequency of the network teaching video sources, and thus the importance levels of the network teaching video sources can be ranked according to the action frequency of the network teaching video sources. FIGS. 2A-2C respectively show sum values of grayscale comparison values and importance level ranks of a plurality of related video sources corresponding to certain network teaching content.

In this exemplary embodiment, performing importance level ranking on the network teaching video sources according to the action frequencies of the plurality of network teaching video sources comprises: ranking average sum values of grayscale comparison values of the network teaching video sources. According to the foregoing logical relationship, average sum values of grayscale comparison values of the network teaching video sources have a positive correlation with the importance levels of the network teaching video sources. Moreover, it can also be determined that the importance level of a network teaching video source with the maximum average sum value of grayscale comparison values is the highest.

In this exemplary embodiment of the present disclosure, the preset analysis algorithm is a customized grayscale shadow comparison method. In the foregoing method, according to scenario information about different network teaching video sources, the shadow value N corresponding to the scenario information is preset, and the shadow value may be used to eliminate the influence of a background light source in the scenario on the luminosity and optimize the comparison of grayscale shadows of different frame images. This preset analysis algorithm is a customized grayscale shadow comparison method.

In step S140, entries of correspondence relationships between preset priorities of a plurality of associated terminal display devices and importance level ranks of the video sources can be acquired, and according to the entries of correspondence relationships, each of the network teaching video sources can be displayed respectively via a terminal display device with a priority corresponding to the importance level rank of the network teaching video source.

In this exemplary embodiment, after importance level ranks of the network teaching video sources are obtained by means of the preset algorithm, according to the entries of correspondence relationships between the preset priorities of the plurality of associated terminal display devices and the importance level ranks of the video sources, a network teaching video source of a corresponding importance level can be displayed on a terminal display device of a corresponding priority for the user to watch and learn.

In this exemplary embodiment, the method further comprises: receiving and saving the preset priorities of the terminal display devices, which are preset by a user, wherein the terminal display device may be a television, a PC display, a mobile phone, a Pad computer, etc., for receiving the network teaching video source, and since these terminal display devices are used individually or simultaneously by the user in different scenarios as a result of different sizes, positions and scenarios, the terminal display devices have different priorities in different scenarios; and after acquiring the preset priorities of the terminal display device, establishing the entries of correspondence relationships between the preset priorities and the importance level ranks of the video sources in conjunction with the current scenario.

In this exemplary embodiment, according to the correspondence entries, respectively displaying each of the network teaching video sources via a terminal display device with a priority corresponding to the importance level ranking of the network teaching video source, comprises: displaying a video source with the highest importance level via a terminal display device with the highest priority. After establishing the entries of correspondence relationships between the preset priorities and the importance level ranks of the video sources, according to the correspondence between the importance levels of the network teaching video sources and the preset priories of the terminal display devices, the network teaching video sources are displayed on the corresponding terminal display devices.

In this exemplary embodiment, the method further comprises: after detecting a change in the importance levels of the teaching video sources or a change in the priorities of the terminal display devices, updating the entries of correspondence relationships between the preset priorities and the importance level ranks of the video sources. For example, in a certain teaching scenario, the current network teaching video source with the highest importance level is oral teaching by a teacher, and after oral teaching has ended, the teacher turns to the teaching of the content of teaching courseware projected on a projector screen. According to the preset analysis algorithm, it may be determined, through analysis, that, from among the plurality of network teaching video sources, the video source for courseware teaching becomes the video source with the highest importance level, and at this time, the entries of correspondence relationships between the preset priorities and the importance level ranks of the video sources is be updated. For another example, while watching the network teaching content on a PC display, if the user needs to go to another room due to having something temporary to do and cannot conveniently continue to watch the network teaching content on the current PC display, but can watch the network teaching content on a portable device such as a Pad computer, the user can actively adjust the priorities of the terminal display devices, i.e., adjust the priority of the Pad computer to be the highest, and then update the entries of correspondence relationships between the preset priorities and the importance level ranks of the video sources.

Figure 3A:
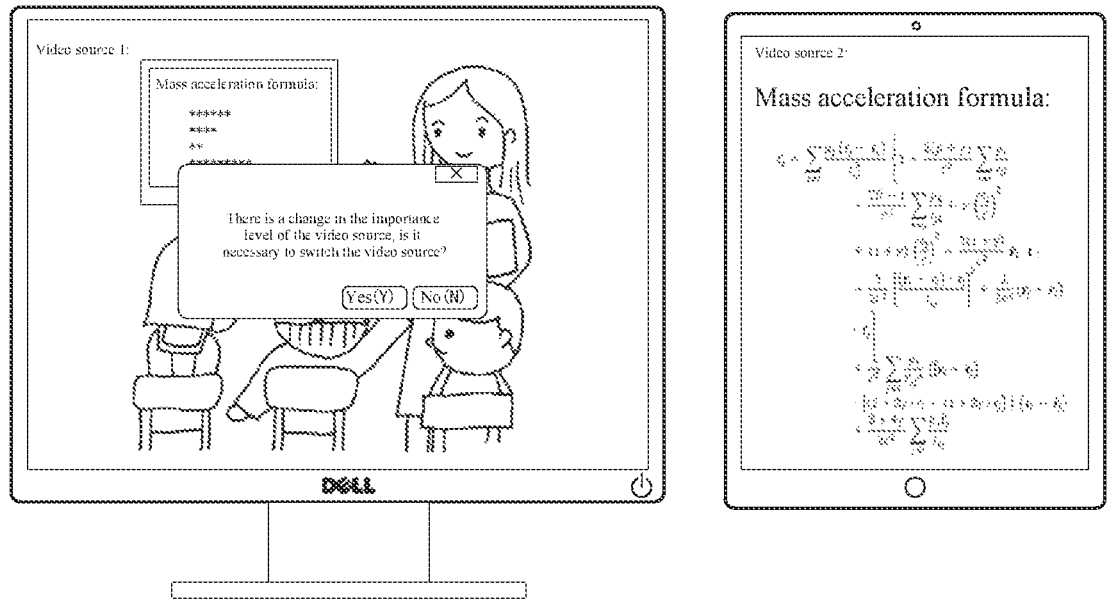
FIGS. 3A-3B show schematic diagrams of an application scenario for a multi-screen interactive network teaching apparatus according to an exemplary embodiment of the present disclosure.

After receiving information about the updating of the entries of correspondence relationships between the preset priorities and the importance level ranks of the video sources, a device switching prompt signal is sent to the terminal display device with the highest priority. As shown in FIG. 3A, which shows a device switching prompt signal received on the user's terminal display device with the highest priority in a certain network teaching scenario, if the user clicks on "Yes", a response signal for confirming the switching of the terminal display device is sent.

Figure 3B:
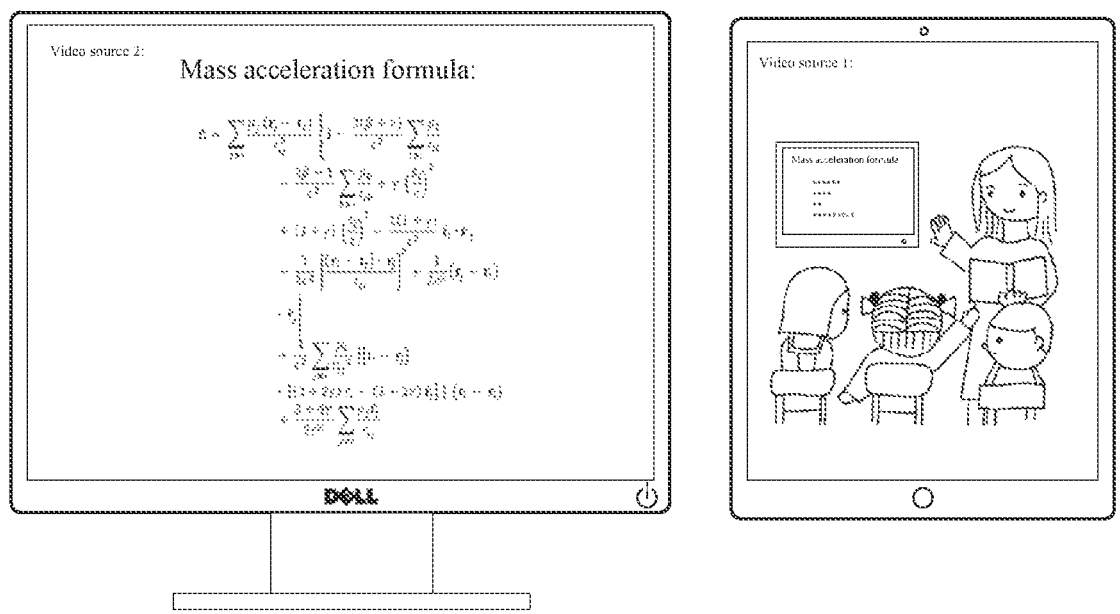

After receiving the response signal, if it is determined to perform playing device switching for the network teaching video sources according to response information carried in the response signal, the corresponding terminal display devices are switched for the plurality of network teaching video sources according to the updated entries of correspondence relationships between the preset priorities and the importance level ranks of the video sources; for example, FIG. 3B is a schematic diagram for after the switching of the terminal display devices.

In this exemplary embodiment, the method further comprises: after detecting a terminal display device switching instruction triggered by a user, acquiring information about the correspondence between a teaching video source identifier and a terminal display device to be switched to, which is carried in the terminal display device switching instruction; and according to the information about the correspondence between the teaching video source identifier and the terminal display device to be switched to, displaying the corresponding teaching video source via the terminal display device to be switched to. When there are a plurality of network teaching video sources or a plurality of terminal display devices, especially when there are a plurality of cumbersome device switching operations, the network teaching video sources are identified, so that a switching operation can be realized in an orderly and quick manner.

In this exemplary embodiment, the method further comprises: recording and compiling statistics on the information about the correspondence between the teaching video source identifier and the terminal display device to be switched to, which is carried in the terminal display device switching instruction triggered by the user, so as to obtain a statistical result; and updating the entries of correspondence relationships between the preset priorities and the importance level ranks of the video sources according to the statistical result. In some network teaching scenarios, all users are considered, by default, to have the same information about the correspondence between the teaching video source identifiers and the terminal display devices to be switched to. However, because of factors such as the personal preferences of different users and the limitations of the terminal display devices, in actual teaching, switching operations are performed several times on the default information about the correspondence between the teaching video source identifiers and the terminal display devices to be switched to and are recorded and counted, and when the number of switching operations exceeds a preset value, it is determined that the switched terminal display device is the default terminal display device for the current user, and thus the entries of correspondence relationships between the preset priorities and the importance level ranks of the video sources can be updated.

In this exemplary embodiment, the information about the correspondence between the teaching video source identifiers and the terminal display devices to be switched to, which is carried in the terminal display device switching instruction, comprises: if information carried in the terminal display device switching instruction is information about the correspondence between a plurality of teaching video source identifiers and one terminal display device to be switched to, displaying the corresponding plurality of teaching video sources via the one terminal display device to be switched to. If there are a plurality of rooms in a scenario where a user learns from network teaching, and there is a terminal display device in each room, the user can set each of the terminal display devices to only receive a signal of the network teaching video source with the importance level, making it convenient for the user to walk in the plurality of rooms, and also watch the signal of the network teaching video source conveniently.

In this exemplary embodiment, the information about the correspondence between the teaching video source identifiers and the terminal display devices to be switched to, which is carried in the terminal display device switching instruction, comprises: if information carried in the terminal display device switching instruction is information about the correspondence between one teaching video source identifier and a plurality of terminal display devices to be switched to, displaying the corresponding one teaching video source respectively on the plurality of terminal display devices to be switched to. If there is only one terminal display device in the scenario where the user learns from network teaching, at this time, the user can make the terminal display device display a signal of the network teaching video source with the highest importance level, or may also arrange to receive signals of a preset number of top-ranked network teaching video sources and simultaneously display same on the currently unique terminal display device.

In this exemplary embodiment, the number of associated video sources is the same as that of the plurality of associated terminal display devices. If there are a plurality of terminal display devices in the scenario where the user learns from network teaching and the number of terminal display devices is the same as that of the network teaching video sources, each of the network teaching video sources may be respectively displayed on each of the terminal display devices, and the importance levels of the network teaching video sources correspond to the priorities of the terminal display devices.

It should be noted that even though various steps of the method in the present disclosure are described in a specific order in the drawing, this is not intended to require or imply that these steps must be executed in this specific order, or that the desired result can only be realized while all the steps shown must be executed. Additionally or alternatively, some steps can be omitted, a plurality of steps can be merged into one step for execution, and/or one step can be subdivided into a plurality of steps for execution.

Figure 4:
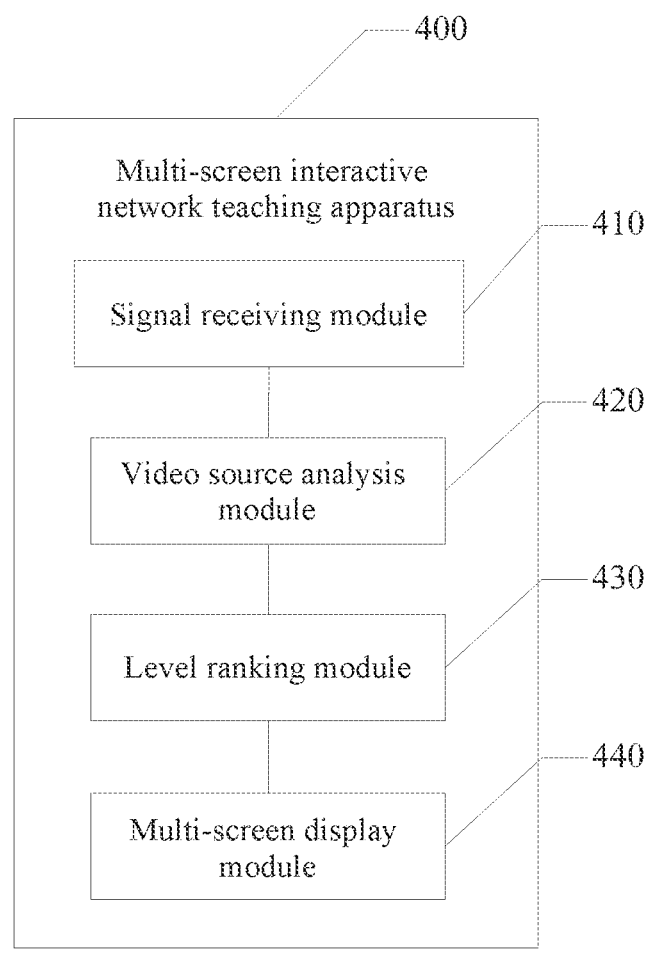
FIG. 4 shows a schematic block diagram of a multi-screen interactive network teaching apparatus according to an exemplary embodiment of the present disclosure.

In addition, in this exemplary embodiment, a multi-screen interactive network teaching apparatus is further provided. Referring to FIG. 4, the multi-screen interactive network teaching apparatus 400 may comprise: a signal receiving module 410, a video source analysis module 420, a level ranking module 430, and a multi-screen display module 440, wherein:

the signal receiving module 410 is used for receiving signals of a plurality of network teaching video sources, wherein the plurality of network teaching video sources are associated video sources;

the video source analysis module 420 is used for analyzing the plurality of network teaching video sources according to a preset analysis algorithm, and determining action frequencies of the plurality of network teaching video sources according to analysis results;

the level ranking module 430 is used for performing importance level ranking on the network teaching video sources according to the action frequencies of the plurality of network teaching video sources; and the multi-screen display module 440 is used for acquiring entries of correspondence relationships between preset priorities of a plurality of associated terminal display devices and the importance level ranking of the video sources, and according to the entries of correspondence relationships, respectively displaying each of the network teaching video sources via a terminal display device with a priority corresponding to the importance level ranking of the network teaching video source.

The specific details of the modules of the multi-screen interactive network teaching apparatus above have been described in detail in the corresponding importance level identification method, and thus will not be described herein.

It should be noted that even though several modules or units of the multi-screen interactive network teaching apparatus 400 are mentioned in the detailed description above, such a division is not mandatory. Indeed, according to the embodiments of the present disclosure, the features and functions of two or more modules or units described above can be embodied in one module or unit. Conversely, the features and functions of one module or unit described above can be further divided into and embodied by a plurality of modules or units.

In addition, in an exemplary embodiment of the present disclosure, an electronic device capable of implementing the method described above is further provided.

A person skilled in the art can understand that each aspect of the present invention may be implemented as a system, a method or a program product. Accordingly, each aspect of the present invention may be specifically implemented in the form of: an entirely hardware embodiment, an entirely software embodiment (including firmware, microcodes, etc.), or an embodiment incorporating hardware and software aspects, which may be collectively referred to herein as a "circuit", "module", or "system".

The electronic device 500 according to such embodiment of the present invention is described below with reference to FIG. 5. The electronic device 500 shown in FIG. 5 is merely an example and should not impose any limitation on the function and usage range of the embodiments of the present invention.

Figure 5:
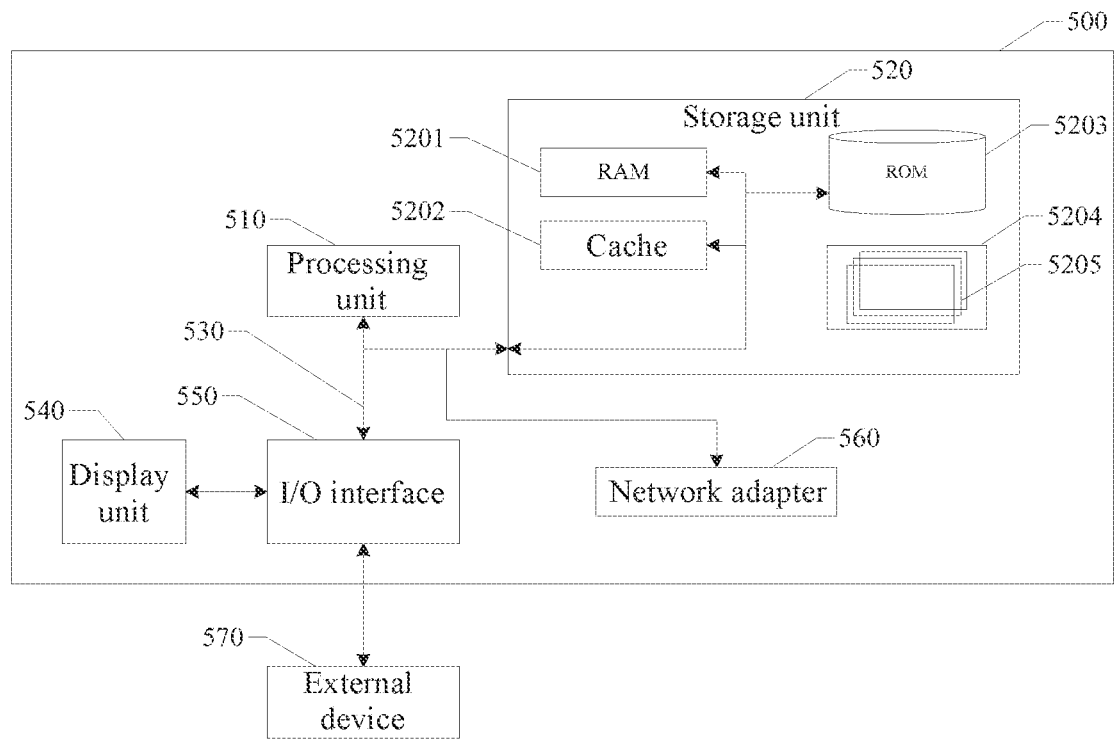
FIG. 5 schematically shows a block diagram of an electronic device according to an exemplary embodiment of the present disclosure.

As shown in FIG. 5, the electronic device 500 is embodied in the form of a general purpose computing device. The components of the electronic device 500 may include, but are not limited to: the at least one processing unit 510, the at least one storage unit 520, a bus 530 for connecting different system components (including the storage unit 520 and the processing unit 510), and a display unit 540.

The storage unit stores program codes, which can be executed by the processing unit 510, such that the processing unit 510 performs the steps according to various exemplary embodiments of the present invention described in the "Exemplary Method" section of the description. For example, the processing unit 510 can perform steps S110 to S140 as shown in FIG. 1.

The storage unit 520 may comprise a readable medium in the form of a volatile storage unit, such as a random access memory (RAM) 5201 and/or a cache storage unit 5202, and may also further comprise a read only memory (ROM) 5203.

The storage unit 520 may also comprise a program/utility tool 5204 having a set of (at least one) program modules 5205, such program modules 5205 including but not limited to: an operating system, one or more application programs, and other program modules and program data, wherein each of or a certain combination of these examples may comprise the implementation of a network environment.

The bus 530 may be representative of one or more of several types of bus structures, including a storage unit bus or a storage unit controller, a peripheral bus, a graphics acceleration port, a processing unit, or a local area bus that uses any of a variety of bus structures.

The electronic device 500 may also communicate with one or more external devices 570 (such as, for example, a keyboard, a pointing device, a Bluetooth device), and may also communicate with one or more devices that enable a user to interact with the electronic device 500, and/or communicate with any device (such as, for example, a router, a modem) that enables the electronic device 500 to communicate with one or more other computing devices. This communication can be conducted via an input/output (I/O) interface 550. Also, the electronic device 500 can also communicate with one or more networks (for example, a local area network (LAN), a wide area network (WAN), and/or a public network, such as the Internet) via a network adapter 560. As shown in the drawing, the network adapter 560 communicates with other modules of the electronic device 500 via the bus 530. It should be understood that, although not shown in the drawing, other hardware and/or software modules may be utilized in conjunction with the electronic device 500, including but not limited to: microcodes, a device driver, a redundant processing unit, an external disk drive array, an RAID system, a tape drive, and a data backup storage system, and the like.

From the description of the embodiments above, it is easy for a person skilled in the art to understand that the exemplary embodiments described herein may be implemented in hardware, and may also be implemented in software in conjunction with necessary hardware. Therefore, the technical solutions according to the embodiments of the present disclosure may be embodied in the form of a software product. The software product may be stored in a non-volatile storage medium (which may be a CD-ROM, a USB flash disk, a mobile hard disk, and the like) or on a network, and may comprise several instructions to enable a computing device (which may be a personal computer, a server, a terminal apparatus, or a network device, and the like) to perform the method according to the embodiments of the present disclosure.

In exemplary embodiments of the present disclosure, a computer readable storage medium is further provided, having stored thereon a program product capable of implementing the method in the description. In some possible embodiments, various aspects of the present invention may also be implemented in the form of a program product comprising program codes for causing, when the program product is running on a terminal device, the terminal device to perform the steps according to various exemplary embodiments of the present invention described in the "Exemplary Method" section of the description.

Figure 6:
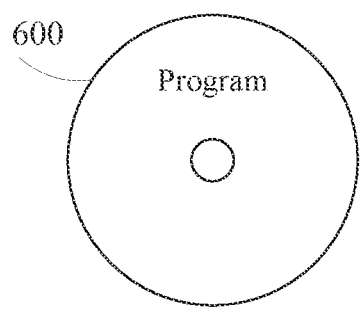
FIG. 6 schematically shows a schematic diagram of a computer readable storage medium in accordance with an exemplary embodiment of the present disclosure.

Referring to FIG. 6, it describes a program product 600 for implementing the above method according to the embodiments of the present invention, which may employ a portable compact disk read only memory (CD-ROM) and comprise program codes, and may be running on a terminal device, for example a personal computer. However, the program product of the present invention is not limited thereto, and in this document, the readable storage medium may be any tangible medium containing or storing a program that can be used by or used in connection with an instruction execution system, apparatus or device.

The program product may employ any combination of one or more readable media. The readable medium may be a readable signal medium or a readable storage medium. The readable storage medium may be, for example, but not limited to, an electronic, magnetic, optical, electromagnetic, infrared, or semiconductor system, apparatus, or device, or any combination thereof. More specific examples of the readable storage media (a non-exhaustive list) comprise: an electrical connection having one or more wires, a portable disk, a hard disk, a random access memory (RAM), a read only memory (ROM), an erasable programmable read only memory (EPROM or flash), fiber optics, a portable compact disk read only memory (CD-ROM), an optical storage device, a magnetic storage device, or any suitable combination thereof.

The computer readable signal medium may comprise a data signal that is propagated in a baseband or as a part of a carrier, in which readable program codes are carried. Such propagated data signal may take a variety of forms, including, but not limited to, an electromagnetic signal, an optical signal, or any suitable combination thereof. The readable signal medium may also be any readable medium, other than a readable storage medium, that can send, propagate, or transmit a program for use by or use in connection with an instruction execution system, apparatus, or device.

The program code contained on the readable medium can be transmitted using any suitable medium, including but not limited to wireless, wired, optical cable, RF, etc., or any suitable combination thereof.

The program codes for performing the operations of the present invention may be written in any combination of one or more programming languages, wherein the programming languages comprise an object oriented programming language, such as Java, and C++, and further comprise conventional procedural programming languages, such as "C" language or similar programming languages. The program codes may be completely executed on a user computing device, partially executed on a user device, executed as an independent software package, executed partially on a user computing device and partially on a remote computing device, or completely executed on a remote computing device or a server. In the case of a remote computing device, the remote computing device can be connected to a user computing device via any kind of network, including a local area network (LAN) or a wide area network (WAN), or can be connected to an external computing device (for example, connected via the Internet with the aid of an Internet service provider).

In addition, the drawings above are merely schematic illustrations of the processing included in the method according to the exemplary embodiments of the present invention, and are not for limitation purpose. It is easy to understand that the processes shown in the drawings above do not represent or limit a time order of these processes. Additionally, it is also easy to understand that these processes may be performed synchronously or asynchronously, for example, in a plurality of modules.

Other embodiments of the present disclosure would readily occur to a person skilled in the art after considering the description and the practice of the invention disclosed herein. The present application is intended to cover any variation, usage or adaptation change of the present disclosure, which follow the general principles of the present disclosure and include common general knowledge or customary technical means in the art that are not disclosed in the present disclosure. The description and embodiments are merely to be regarded exemplary, while the true scope and spirit of the present disclosure are indicated by the claims.

It should be understood that the present disclosure is not limited to the precise structures described and shown in the accompanying drawings, and various modifications and changes may be made without departing from the scope thereof. The scope of the present disclosure is merely defined by the appended claims.

INDUSTRIAL APPLICABILITY

On one hand, by means of the customized grayscale shadow comparison method, action frequencies of various network teaching video sources are quickly analyzed so as to obtain the importance levels of the video sources, and by customizing a shadow value, the identification of the importance levels of video sources in different teaching scenarios is eliminated to some extent, so that this is an efficient and accurate importance level identification algorithm for network teaching video sources. On the other hand, by means of the method involving ranking the priorities of user terminal display devices and making same correspond to the importance levels of network teaching video sources, a user can continuously track important teaching contents, such that the user experience is greatly enhanced.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A multi-screen interactive network teaching method, comprising:
receiving signals of a plurality of network teaching video sources, wherein the plurality of network teaching video sources are associated video sources;
analyzing each network teaching video source of the plurality of network teaching video sources according to a preset analysis algorithm, and determining an action frequency for each network teaching video source of the plurality of network teaching video sources according to analysis results;
performing importance level ranking on the network teaching video sources according to the action frequencies of the plurality of network teaching video sources;
acquiring entries of correspondence relationships between preset priorities of a plurality of associated terminal display devices and importance level ranks of the video sources, and according to the entries of correspondence relationships, respectively displaying each of the network teaching video sources via a respective, different terminal display device with a priority corresponding to the importance level ranks of the network teaching video sources;

after detecting a terminal display device switching instruction triggered by a user, acquiring information about the correspondence between a teaching video source identifier and a terminal display device to be switched to, which is carried in the terminal display device switching instruction; and according to the information about the correspondence between the teaching video source identifier and the terminal display device to be switched to, displaying the corresponding teaching video source via the terminal display device to be switched to, wherein the preset analysis algorithm is a customized grayscale shadow comparison method.

2. The method of claim 1, wherein analyzing each network teaching video source of the plurality of network teaching video sources according to the preset analysis algorithm, and determining the action frequency for each network teaching video source of the plurality of network teaching video sources according to analysis results comprises:

periodically extracting a frame image from the signal of the network teaching video source, and calculating an average grayscale value A of the frame image, where: A=(Red+Green+Blue)/3;

acquiring scenario information about the network teaching video source, and presetting a shadow value N according to the scenario information;

obtaining a conversion factor C according to the customized shadow value:

$$C=255/(N-1);$$

calculating a grayscale value G for each of the extracted frame images according to the average grayscale value A and the conversion factor C, comprising:

$$G=\text{Math·round}((A/C)+0.5)*C$$

where Math·round is a rounding function; and calculating a sum value of grayscale comparison values of the network teaching video source according to the grayscale values $G_k$:

$$H=\Sigma_1^n \|G_k - \overline{G}\|;$$

where $\overline{G}$ is a mean value of the grayscale values $G_k$ of the signal of the network teaching video source and the grayscale values $G_k$ are in a range from $G_1$ to $G_n$, where $G_1$ is a first grayscale value of a first extracted frame image of the extracted frame images and $G_n$ is an nth grayscale value of an nth extracted frame image of the extracted frame images, and the sum value of grayscale comparison values is used for characterizing the action frequency of the teaching video source.

3. The method of claim 2, wherein performing the importance level ranking on the network teaching video sources according to the action frequencies of the plurality of network teaching video sources comprises:

ranking average sum values of grayscale comparison values of the network teaching video sources; and determining the importance level of a network teaching video source with the maximum average sum value of grayscale comparison values to be the highest.

4. The method of claim 1, further comprising:

receiving and saving the preset priorities of the terminal display devices preset by a user; and establishing the entries of correspondence relationships between the preset priorities and the importance level ranks of the video sources.

5. The method of claim 1, wherein according to the correspondence entries, respectively displaying each of the network teaching video sources via a terminal display device with a priority corresponding to the importance level ranking of the network teaching video source comprises:

displaying a video source with the highest importance level via a terminal display device with the highest priority.

6. The method of claim 1, further comprising:

after detecting a change in the importance levels of the teaching video sources or a change in the priorities of the terminal display devices, updating the entries of correspondence relationships between the preset priorities and the importance level ranks of the video sources;

sending a device switching prompt signal to the terminal display device with the highest priority; and after receiving a response signal, if it is determined to perform playing device switching for the network teaching video sources according to response information carried in the response signal, switching the corresponding terminal display devices for the plurality of network teaching video sources according to the updated entries of correspondence relationships between the preset priorities and the importance level ranks of the video sources.

7. The method of claim 1, further comprising:

recording and compiling statistics on the information about the correspondence between the teaching video source identifier and the terminal display device to be switched to, which is carried in the terminal display device switching instruction triggered by the user, so as to obtain a statistical result; and updating the entries of correspondence relationships between the preset priorities and the importance level ranks of the video sources according to the statistical result.

8. The method of claim 1, wherein the information about the correspondence between the teaching video source identifier and the terminal display device to be switched to, which is carried in the terminal display device switching instruction, comprises:

if information carried in the terminal display device switching instruction is information about the correspondence between a plurality of teaching video source identifiers and one terminal display device to be switched to, displaying the corresponding plurality of teaching video sources via the one terminal display device to be switched to.

9. The method of claim 1, wherein the information about the correspondence between the teaching video source identifier and the terminal display device to be switched to, which is carried in the terminal display device switching instruction, comprises:

if information carried in the terminal display device switching instruction is information about the correspondence between one teaching video source identifier and a plurality of terminal display devices to be switched to, displaying the corresponding one teaching video source respectively on the plurality of terminal display devices to be switched to.

10. The method of claim 1, wherein the number of the associated video sources is the same as that of the plurality of associated terminal display devices.

11. An electronic device, comprising:
a processor; and
a memory having stored thereon computer readable instructions that, when executed by the processor, implement the method of claim 1.

12. A computer readable storage medium having stored thereon a computer program that, when executed by a processor, implements the method of claim 1.

* * * * *